(12) United States Patent
Yang et al.

(10) Patent No.: US 7,375,930 B2
(45) Date of Patent: May 20, 2008

(54) APPARATUS FOR PZT ACTUATION DEVICE FOR HARD DISK DRIVES

(75) Inventors: Xiao Yang, Fremont, CA (US); Visit Thaveeprungsriporn, Bangkok (TH); Szu-Han Hu, Bangkok (TH)

(73) Assignee: Magnecomp Corporation, Temecula, CA (US)

( * ) Notice: Subject to any disclaimer, the term of this patent is extended or adjusted under 35 U.S.C. 154(b) by 245 days.

(21) Appl. No.: 10/330,407

(22) Filed: Dec. 27, 2002

(65) Prior Publication Data
US 2004/0125510 A1     Jul. 1, 2004

(51) Int. Cl.
*G11B 5/56* (2006.01)
(52) U.S. Cl. .................................... 360/294.4
(58) Field of Classification Search ........... 360/294.4, 360/294.3, 294.6, 294.1, 264.5
See application file for complete search history.

(56) References Cited

U.S. PATENT DOCUMENTS

| | | | |
|---|---|---|---|
| 4,542,429 A * | 9/1985 | Nishida et al. ............ 360/75 |
| 5,598,307 A | 1/1997 | Bennin | |
| 5,645,735 A | 7/1997 | Bennin et al. | |
| 5,793,571 A | 8/1998 | Jurgenson et al. | |
| 5,796,558 A | 8/1998 | Hanrahan et al. | |
| 5,805,375 A | 9/1998 | Fan et al. | |
| 5,835,306 A | 11/1998 | Bennin | |
| 5,867,347 A | 2/1999 | Knight et al. | |
| 5,898,541 A * | 4/1999 | Boutaghou et al. ...... 360/294.4 |
| 5,898,544 A | 4/1999 | Krinke et al. | |
| 5,914,834 A | 6/1999 | Gustafson | |
| 5,998,906 A | 12/1999 | Jerman et al. | |
| 6,055,132 A | 4/2000 | Arya et al. | |
| 6,069,771 A * | 5/2000 | Boutaghou et al. ...... 360/294.4 |
| 6,108,175 A | 8/2000 | Hawwa et al. | |
| 6,118,637 A * | 9/2000 | Wright et al. ............ 360/294.4 |
| 6,134,087 A | 10/2000 | Khan et al. | |
| 6,166,890 A * | 12/2000 | Stefansky et al. ........ 360/294.4 |
| 6,201,668 B1 | 3/2001 | Murphy | |
| 6,233,124 B1 | 5/2001 | Budde et al. | |
| 6,239,952 B1 * | 5/2001 | Bonin ...................... 360/294.4 |
| 6,239,953 B1 | 5/2001 | Mei | |
| 6,246,552 B1 * | 6/2001 | Soeno et al. ............. 360/294.4 |
| 6,278,583 B1 | 8/2001 | Adley | |
| 6,278,587 B1 | 8/2001 | Mei | |
| 6,297,936 B1 * | 10/2001 | Kant et al. ................ 360/294.4 |

(Continued)

OTHER PUBLICATIONS

Koganezawa et al., "Development of Shear-Mode Piezoelectric Microactuator for Precise Head Positioning," *Fujitsu Sci Tech., J.* vol. 37, No. 2, p. 212-219, (Dec. 2001).

(Continued)

*Primary Examiner*—Brian E. Miller
(74) *Attorney, Agent, or Firm*—Intellectual Property Law Office of Joel D. Voelzke (57) ABSTRACT

A method (and apparatus) for operating a disk drive apparatus. The method includes moving a movable member about a fixed position to move a read/write head coupled to a slider to a selected track on a disk. The selected track is at least one of a plurality of tracks. The method includes adjusting a position of the read/write head using an actuating device integrated on the gimbal. The actuating step moves the read/write head relative in a manner normal to the track on the magnetic disk to align the read/write head on the track using a finer and faster alignment of the read/write head than the moveable support member.

14 Claims, 9 Drawing Sheets

U.S. PATENT DOCUMENTS

| | | |
|---|---|---|
| 6,298,545 B1 | 10/2001 | Mohajerani et al. |
| 6,331,923 B1 | 12/2001 | Mei |
| 6,333,681 B1 | 12/2001 | Takeuchi et al. |
| 6,335,850 B1 | 1/2002 | Dunfield et al. |
| 6,351,354 B1 | 2/2002 | Bonin |
| 6,362,542 B1 | 3/2002 | Novotny |
| 6,376,964 B1 * | 4/2002 | Young et al. ............... 310/311 |
| 6,393,681 B1 | 5/2002 | Summers |
| 6,396,174 B1 | 5/2002 | Vigna et al. |
| 6,404,600 B1 | 6/2002 | Hawwa et al. |
| 6,456,464 B1 | 9/2002 | Khan et al. |
| 6,487,055 B1 | 11/2002 | Mei |
| 6,624,982 B2 * | 9/2003 | Masuda et al. ........... 360/294.4 |
| 6,671,131 B2 * | 12/2003 | Kasajima et al. ........ 360/294.4 |
| 6,690,551 B2 * | 2/2004 | Shiraishi et al. ......... 360/294.4 |
| 6,700,749 B2 * | 3/2004 | Shiraishi et al. ......... 360/294.4 |
| 6,738,231 B2 * | 5/2004 | Arya et al. ............... 360/294.4 |
| 6,930,860 B1 * | 8/2005 | Coffey ..................... 360/294.4 |
| 7,006,333 B1 * | 2/2006 | Summers ................. 360/294.4 |
| 7,016,159 B1 | 3/2006 | Bjorstrom et al. |
| 7,130,159 B2 * | 10/2006 | Shimizu et al. .......... 360/294.4 |
| 7,177,199 B2 | 2/2007 | Bennin et al. |
| 2002/0051326 A1 * | 5/2002 | Shiraishi et al. ......... 360/294.4 |
| 2002/0141117 A1 * | 10/2002 | Kasajima et al. ........ 360/294.4 |

OTHER PUBLICATIONS

Mori et al., "A Dual Stage Magnetic Disk Drive Actuator Using A Piezoelectric Device for a High Track Density", *IEEE Transactions Magnetics*, vol. 27, No. 6, p. 5298-5300, (Nov. 1991).

Tang et al., Micro Electrostatic Actuators in Dual Stage Disk With High Track Density: *IEEE Transactions on Magnetics*, vol. 32, No. 5, p. 3851-3853, (Sep. 1996).

\* cited by examiner

APPARATUS FOR PZT ACTUATION DEVICE FOR HARD DISK DRIVES

BACKGROUND OF THE INVENTION

This invention generally relates to techniques for operating a disk drive apparatus. More particularly, the present invention provides a method and apparatus for reading and writing information onto a computer disk commonly called a hard disk for storing data. Merely by way of example, the present invention is implemented using such method and apparatus with an actuating device coupled between a read/write head and support member for fine tuning the read/write head onto a data track on the hard disk, but it would be recognized that the invention has a much broader range of applicability.

Storage of information has progressed through the years. From the early days, primitive man stored information on walls of caves, as well as used writings on wood such as bamboo. Since then, people have used wood, silk, and papers as a media for writings. Paper has been bound to form books. Information is now stored electronically on disks, tape, and semiconductor devices. As merely an example, some of the early disks used magnetic technology to store bits of information in a digital manner onto the magnetic media. One of the first disk drives was discovered in the 1950's by International Business Machines of Armonk, N.Y.

Although such disks have been successful, there continues to be a demand for larger storage capacity drives. Higher storage capacity can be achieved in part by increasing an aerial density of the disk. That is, the density increases with the number of tracks per inch (TPI) and the number of bits per inch (BPI) on the disk.

As track density increases, however, the data track becomes narrower and the spacing between data tracks on the disk decreases. It becomes increasingly difficult for the motor and servo control system to quickly and accurately position the read/write head over the desired track. Conventional actuator motors, such as voice coil motors (VCM), often lack sufficient resolution and bandwidth to effectively accommodate high track-density disks. As a result, a high bandwidth and resolution second-stage microactuator is often necessary to precisely position the read/write head over a selected track of the disc. Thus, there is a need for an improved drive apparatus.

SUMMARY OF THE INVENTION

According to the present invention, techniques for operating a disk drive apparatus are provided. More particularly, the present invention provides a method and apparatus for reading and writing information onto a computer disk commonly called a hard disk for memory applications. Merely by way of example, the present invention is implemented using such method and apparatus using with an actuating device coupled between a read/write head and support member for fine tuning the read/write head onto a data track on the hard disk, but it would be recognized that the invention has a much broader range of applicability.

In a specific embodiment, the invention provides a disk drive apparatus, e.g., hard disk drive system. The apparatus has a magnetic disk for storing information, which includes a plurality of tracks. The method also includes a movable support member often called Head Gimbal Assembly or HGA coupled to the magnetic disk. The HGA includes a read/write head and a suspension. The suspension is comprised of a trace gimbal or TG and a loadbeam. The gimbal has a tongue portion. A slider device is coupled to the tongue portion. A read/write head is coupled to the slider device. The gimbal has certain stiffness that allows the read/write head to pitch and roll around a pivotal point at the center of the tongue. A drive device is coupled between the magnetic disk and the suspension. The primary drive device, e.g., a voice coil motor or VCM, is adapted to move the read/write head on a track on the magnetic disk using the suspension to suspend the read/write head over the disk at a distance of few nanometers. A second stage actuator device is integrated on the gimbal close to the slider. The actuator device is adapted to move the slider to a position normal to the track on the magnetic disk to align the read/write head on the track using a finer and faster alignment of the read/write head than the moveable support member driven by the VCM.

In a specific embodiment, there are a pair of actuator devices including a first actuator device and a second actuator device. A first spring device is coupled to the first actuator device to counter act a first force provided by the first actuator device and a second spring device is coupled to the second actuator device to counter act a second force provided by the second actuator device. The first spring device and the second spring device are also operably coupled to the actuator devices to allow the read/write head to adjust to a surface topography of the magnetic disk medium.

Preferably, the actuating devices includes a first PZT material and a second PZT material. The first PZT material has a first end coupled to a first side of the slider and the second PZT material has a first end coupled to a second side of the slider. The first side is opposite of the second side, whereupon the first PZT material contracts by a first predetermined distance and the second PZT material expands by a second predetermined distance such that the slider rotates in a first direction about a region to move the read/write head. Alternatively, first PZT material expands by a first predetermined distance and the second PZT material contracts by a second predetermined distance such that the slider rotates in a second direction about a region to move the read/write head. The first direction is opposite (or counter to) of the second direction.

In an alternative specific embodiment, the invention provides a method for operating a disk drive apparatus. The method includes moving a suspension about a fixed position to move a read/write head element coupled to a slider to a selected track on a disk. The selected track is at least one of a plurality of tracks. The method includes correcting off-track error of the read/write head using a second-stage actuating device on the TG close to the slider. The actuating step moves the read/write head relative in a manner normal to the track on the magnetic disk to align the read/write head on the track using a finer and faster alignment of the read/write head than the VCM.

In yet an alternative specific embodiment, the invention includes an apparatus for a disk drive. A suspension has a first end and a second end. The first end is connected to an arm that is adapted to couple about a pivot region. The second end includes a tongue portion. A slider is coupled to the tongue portion. The slider acts as an air bearing and a support member. A read/write head is coupled to the slider. An actuating device is integrated on the gimbal close to the slider. The actuating device is capable of moving the read/write head in a manner normal to a track on a magnetic disk to align the read/write head to a desired track to a tolerance of less than 20 nanometers and at a frequency of greater than 4 kHz.

Numerous benefits are achieved using the present invention over conventional techniques. For example, the present invention can be implemented using existing fabrication technologies. Additionally, the present invention can provide for alignment of a read/write head to track density of 250 k TPI (track per inch) or 100 Gbit/in$^2$ and greater at 4 kHz or greater. In certain embodiments, the present invention can be implemented using a small form factor, e.g., less than 100 microns in thickness, which results in no change in disk-disk spacing and causes little additional off-track error due to "windage effect." The invention can also be easy to manufacture and apply according to certain embodiments. In certain embodiments, the invention also uses the PZT layer as a shock absorber for the suspension assembly. Preferably, the piezoelectric material acts as a shock absorbing material to absorb a mechanical force from the read/write head when the read/write head comes in contact with the magnetic disk medium and/or damp out vibrations from the suspension to reduce an incidence of off track errors. In other embodiments, the invention allows the read/write head to pitch, roll, and rotate. Depending upon the embodiment, one or more of these benefits may be used. These and other benefits are described throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, techniques for operating a disk drive apparatus are provided. More particularly, the present invention provides a method and apparatus for reading and writing information onto a computer disk commonly called a hard disk for memory applications. Merely by way of example, the present invention is implemented using such method and apparatus using with an actuating device integrated on the gimbal for fine tuning the read/write head onto a data track on the hard disk, but it would be recognized that the invention has a much broader range of applicability.

Figure 1:
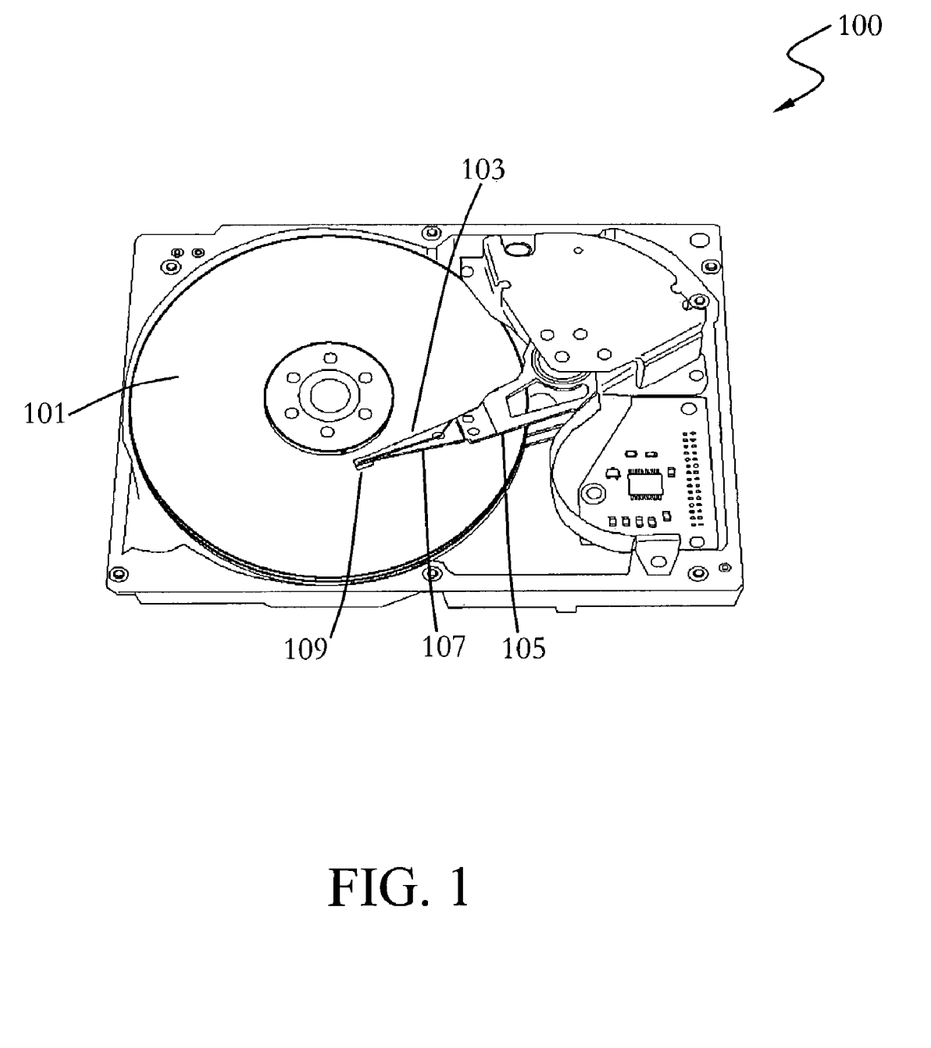
FIG. 1 is a simplified top-view diagram of a disk drive apparatus according to an embodiment of the present invention.

FIG. 1 is a simplified top-view diagram 100 of a disk drive apparatus according to an embodiment of the present invention. This diagram is merely an example, which should not unduly limit the scope of the claims herein. One of ordinary skill in the art would recognize many other variations, modifications, and alternatives. As shown, the apparatus 100 includes various features such as disk 101, which rotates about a fixed axis. The disk also includes tracks, which are used to store information thereon. The disk rotates at 7,200 RPM to greater than about 10,000 depending upon the embodiment. The disk, commonly called a platter, often includes a magnetic media such as a ferromagnetic material, but can also include optical materials, common coated on surfaces of the disk, which become active regions for storing digital bit information. Overlying the disk is head gimbal assembly or HGA 103, which operates and controls a slider 109 coupled to a read/write head. The head gimbal assembly is coupled to suspension 107 which couples to an arm 105. The arm is coupled to a voice coil motor or VCM, which moves the head assembly about a pivot point in an annular manner. The VCM can move at a frequency of up to about 1 kHz. Preferably, for high track density, e.g. 250 k TPI, the speed is at least 4 kHz, but can also be greater in certain embodiments. Further details of the head assembly are provided throughout the present specification and more particularly below.

Figure 2:
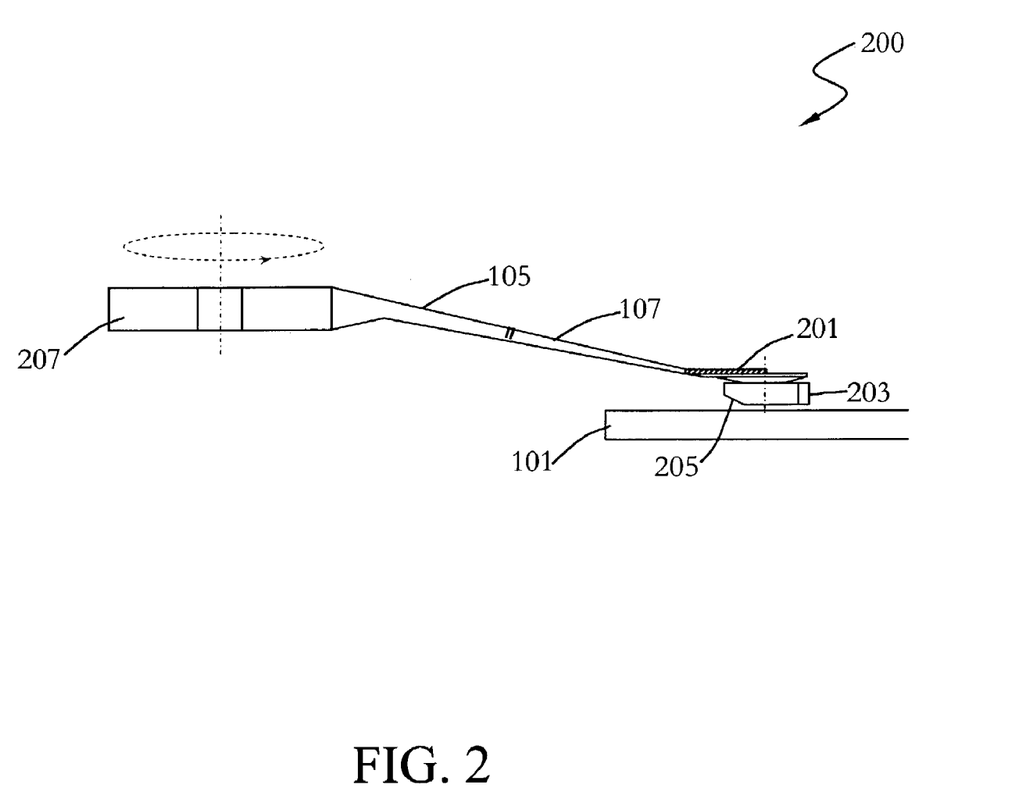
FIG. 2 is a more detailed side-view diagram of a disk drive arm assembly according to an embodiment of the present invention.

FIG. 2 is a more detailed side-view diagram of a disk drive arm assembly 200 according to an embodiment of the present invention. This diagram is merely an example, which should not unduly limit the scope of the claims herein. One of ordinary skill in the art would recognize many other variations, modifications, and alternatives. Like reference numerals are used in this diagram as certain other diagrams herein, which should not be limiting. As shown, the assembly includes suspension 107 coupled to arm 105 coupled to voice coil motor 207. Slider 205 is coupled to another end of the suspension, the gimbal. The slider includes read/write head 203. The head is positioned over a track on the platter 101, which is among a plurality of tracks on the disk.

Preferably, the head gimbal assembly also includes a micro actuator device 201 integrated on the gimbal. The actuating device moves the head in a direction normal to a direction of the track according to a specific embodiment. Preferably, the actuating device is made of a PZT material, which is operable in the transverse expansion mode, but can also be in other modes.

Figure 3:
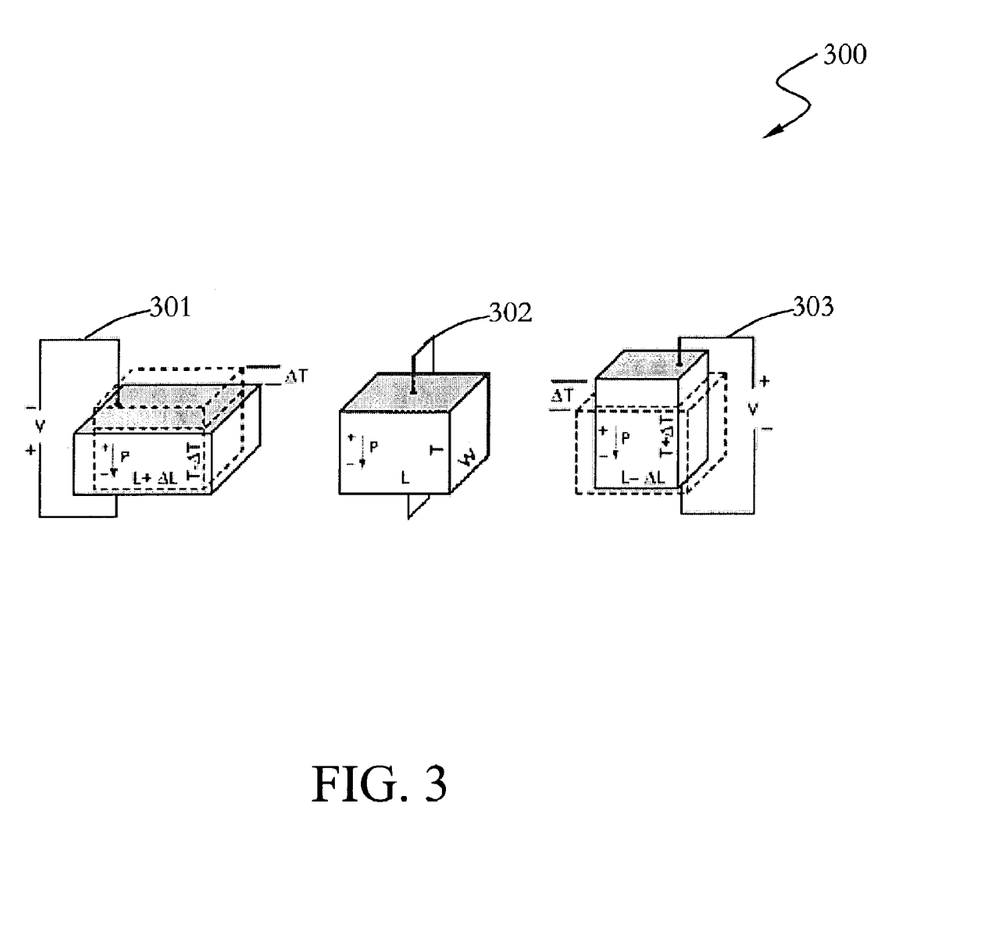
FIG. 3 is a detailed diagram of piezoelectric parallel and transverse expansion operating mode according to an embodiment of the present invention.

FIG. 3 is a detailed diagram of piezoelectric transverse operation. As shown, voltage is applied between an upper electrode and a lower electrode. A PZT material is sandwiched between the electrodes. The diagram illustrates at least three modes of operation. Referring to reference numeral 302, no voltage is applied between the electrodes, which allows the PZT to be a first state. Alternatively, a negative voltage 301 is applied on the upper electrode relative to the lower electrode, which causes the PZT material to expand in size by an amount defined by delta L in a first direction and also contracts by a delta T in a second direction. Alternatively, a positive voltage 303 is applied on the upper electrode relative to the lower electrode, which causes the PZT material to contract in size by an amount defined by delta L in a first direction and also expands by a delta T in a second direction. Further details of such PZT material as applied to the present invention is provided more fully below.

Figure 4:
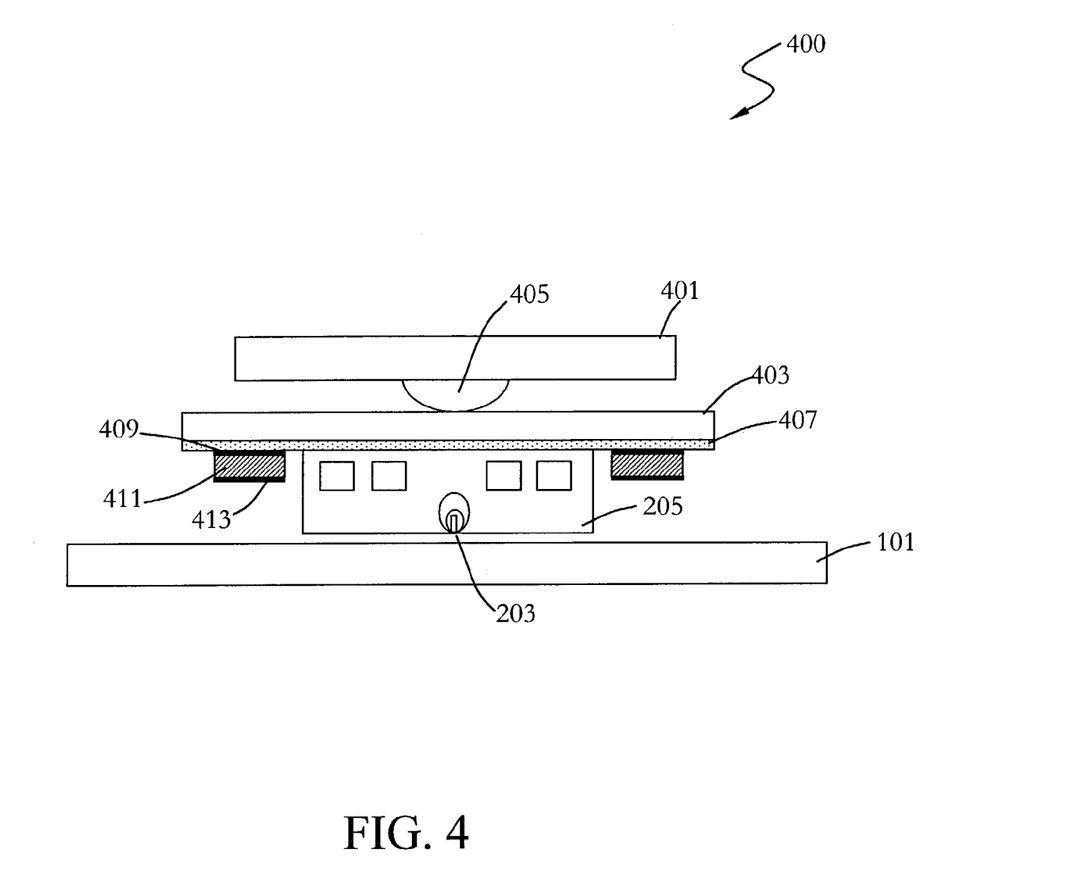
FIG. 4 is a detailed front-view diagram of a loadbeam, a gimbal, a PZT micro actuator, a slider and head assembly according to an embodiment of the present invention.

FIG. 4 is a detailed front-view diagram of head, gimbal and PZT microactuator assembly 400 according to an embodiment of the present invention. This diagram is merely an example, which should not unduly limit the scope of the claims herein. One of ordinary skill in the art would recognize many other variations, modifications, and alternatives. As shown, the head, gimbal and PZT microactuator assembly 400 includes slider 205 coupled to gimbal 403. The actuating device 413 is coupled to gimbal 403. The actuating device includes a pair of PZT actuating elements symmetrically located on each of the sides of the slider 205 in a parallel alignment configuration. That is, a first PZT element is disposed along a first side of the slider and a second PZT element is disposed along a second side of the slider, which is opposite to the first side of the slider according to a specific embodiment. Each of the PZT actuators includes top and bottom electrodes 411 and 415 with opposite polarity. The top electrode is coupled to an insulation material 407 such as polyimide on the gimbal 403. Copper traces (not shown) connect the read/write head and PZT actuator to the drive electronics. Preferably, the PZT actuator also provides a shock-absorbing characteristic for the suspension assembly. The head gimbal assembly or HGA and pitch and roll around the pivotal point against a dimple 405 which is coupled to a loadbeam 401. The slider includes read/write head 203. The head is positioned over a track on the platter 101, which is among a plurality of tracks on the disk.

Figure 5:
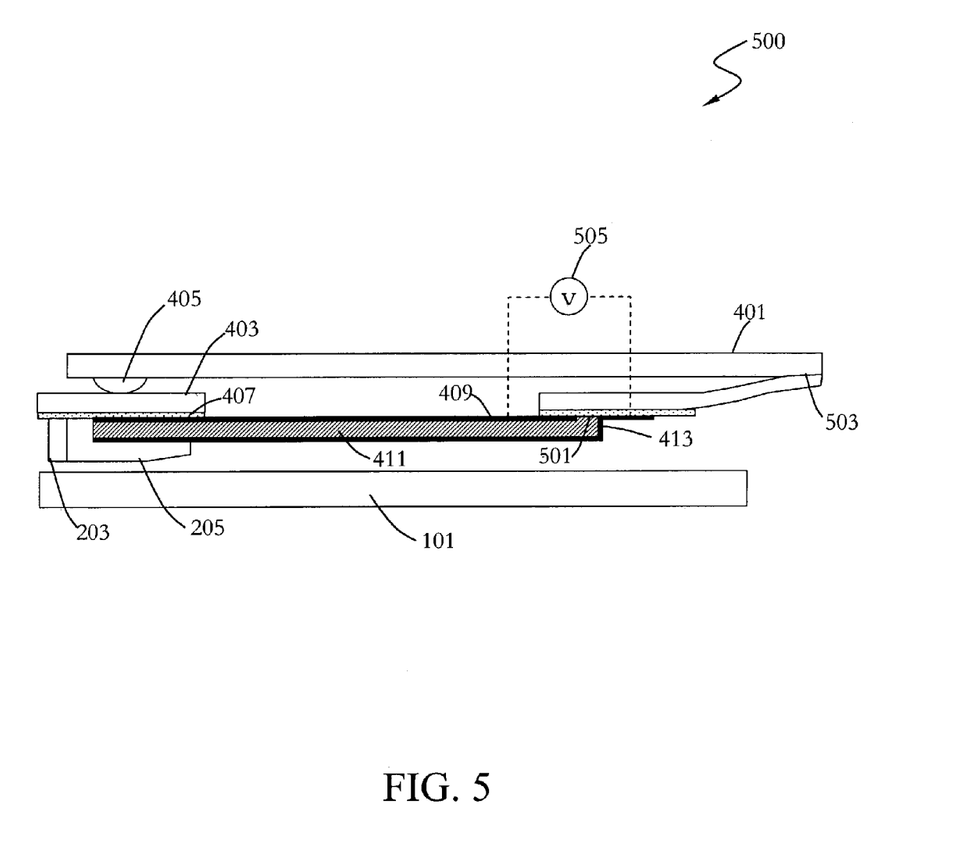
FIG. 5 is a detailed side-view diagram of a loadbeam, a gimbal, a PZT micro actuator, a slider and head assembly according to an embodiment of the present invention.

FIG. 5 is a detailed side-view diagram of a head, gimbal and PZT microactuator assembly 500 according to an embodiment of the present invention. This diagram is merely an example, which should not unduly limit the scope of the claims herein. One of ordinary skill in the art would recognize many other variations, modifications, and alternatives. As shown, head, gimbal and PZT microactuator assembly 500 includes slider 205 coupled to gimbal 403 with insulating material 407 in between such as polyimide. The actuating device 413 is a PZT element coupled to gimbal 403. The PZT actuator includes top electrode 411 and bottom electrode 415. As shown, the PZT actuator is elongated in shape as a member from a first end to a second end. The first end is attached to a portion (i.e., tongue) of the gimbal coupled to a side of the slider. The second end is attached to another portion of the gimbal.

The electrodes have opposite polarity and are physically separated 501. A voltage 505 is applied between the two electrodes to create an electrical field across the PZT material. Under the electrical field, the PZT material expands or contracts depending upon the polarity of the applied voltage. The top electrode is coupled to an insulation material 407 such as polyimide on the gimbal 403. Copper traces (not shown) connect the read/write head and PZT actuator to the drive electronics. The head gimbal assembly or HGA and pitch and roll around the pivotal point against a dimple 405 which is coupled to a loadbeam 401. The gimbal is welded to the loadbeam at 503. The slider includes read/write head 203. The head is positioned over a track on the platter 101, which is among a plurality of tracks on the disk.

Figure 6:
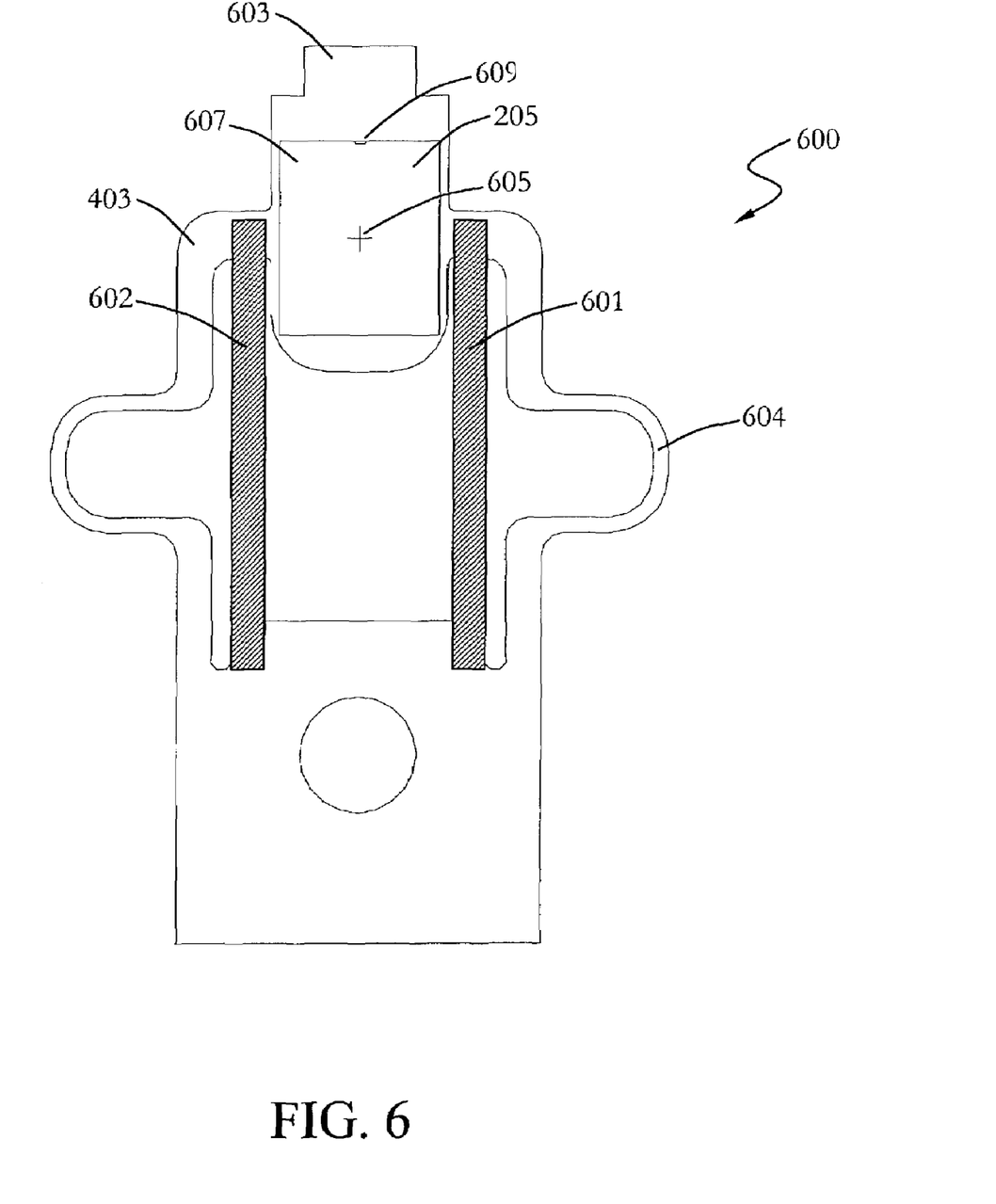
FIG. 6 is a detailed top-view diagram of a gimbal with folded spring, a pair of PZT microactuator, a slider and head assembly according to embodiments of the present invention.

FIG. 6 is a detailed top-view diagram of a head, gimbal and PZT microactuator assembly 600 according to an embodiment of the present invention. This diagram is merely an example, which should not unduly limit the scope of the claims herein. One of ordinary skill in the art would recognize many other variations, modifications, and alternatives. As shown, head, gimbal and PZT microactuator assembly 600 includes slider 205 coupled to gimbal 403. The actuating device 601 and 602 is a pair of PZT elements coupled to gimbal 403. The gimbal includes a tongue portion 603 and a folded spring portion comprising a pair of folded springs 604. The slider is coupled to the tongue portion using adhesive materials such as epoxy. The folded spring portion provides sufficient compliance to allow the slider to rotate around the center point 605 when the PZT elements actuate. As a result, the actuating moves the read/write head 609 relative in a manner vertical to the track on the magnetic disk to align the read/write head on the track using a finer alignment of the read/write head than the VCM.

Figure 7:
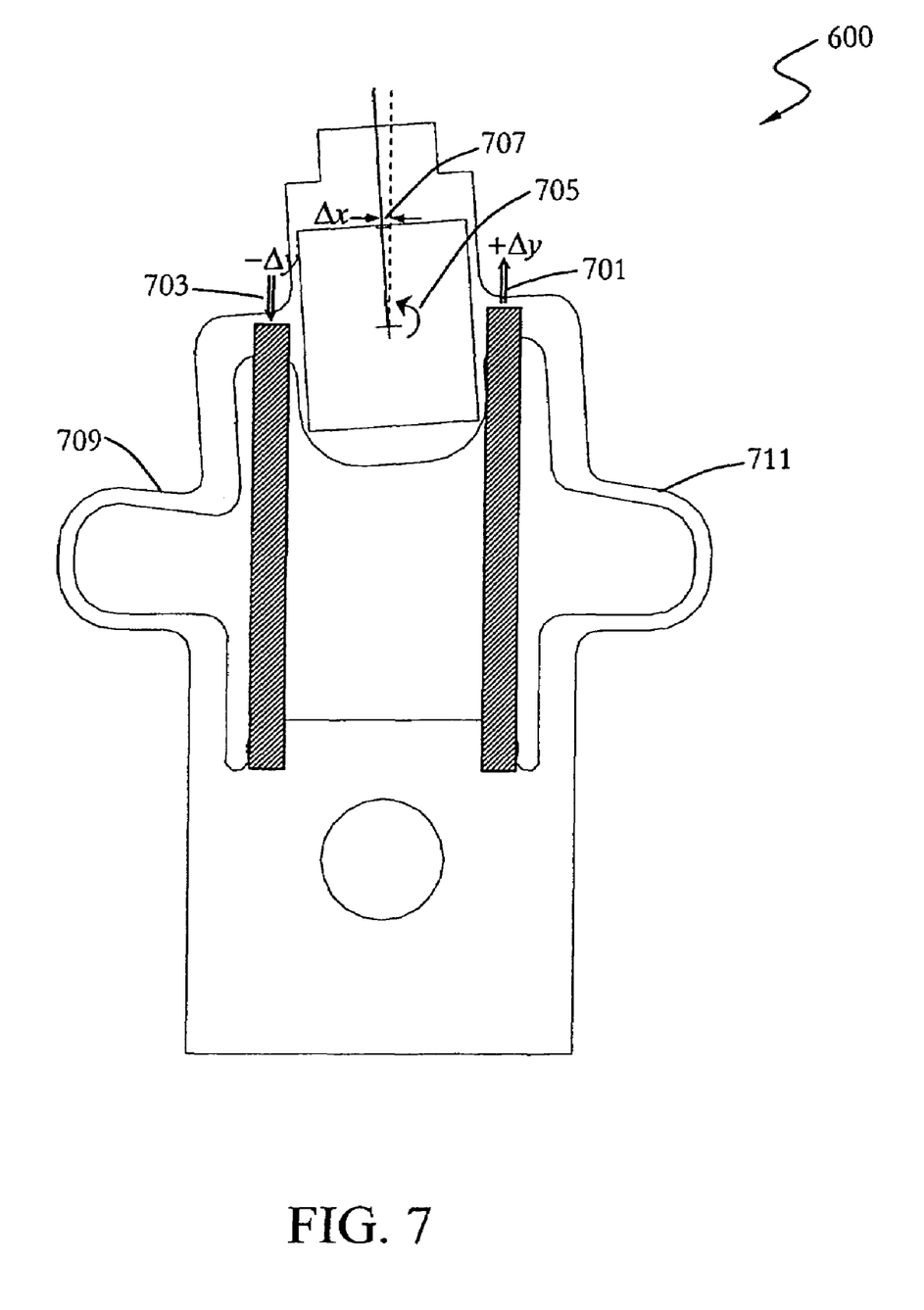
FIG. 7 is a detailed top-view diagram of actuated PZT microactuators, a gimbal with deformed folded spring, a rotated slider and head assembly according to embodiments of the present invention.
Figure 8A:
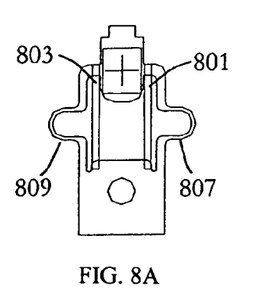
FIGS. 8A-8L are top-view diagrams of design variations of a PZT microactuator on a gimbal according to embodiments of the present invention.
Figure 8B:
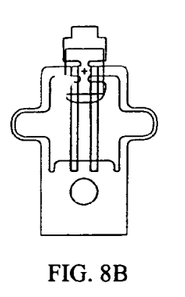
Figure 8C:
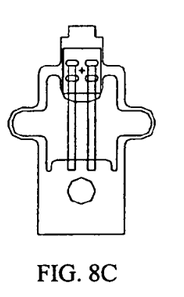
Figure 8D:
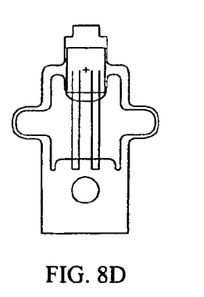
Figure 8E:
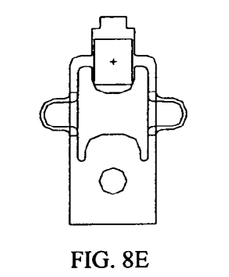
Figure 8F:
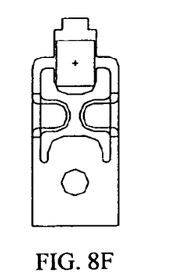
Figure 8G:
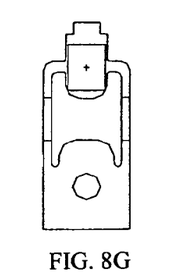
Figure 8H:
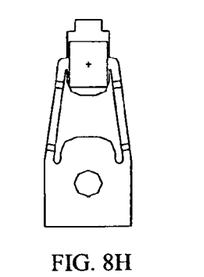
Figure 8I:
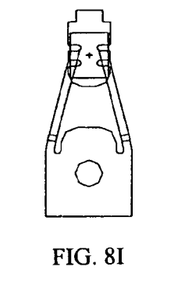
Figure 8J:
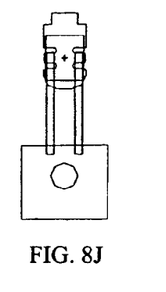
Figure 8K:
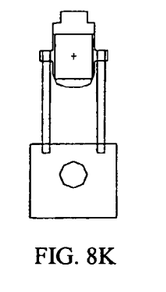
Figure 8L:
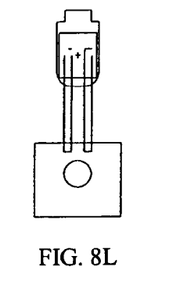

FIG. 7 is a detailed top-view diagram of actuated head, gimbal and PZT microactuator assembly 600 according to an embodiment of the present invention. This diagram is merely an example, which should not unduly limit the scope of the claims herein. One of ordinary skill in the art would recognize many other variations, modifications, and alternatives. As shown, head, gimbal and PZT microactuator assembly 600 includes a pair of PZT microactuator in operation. One of the actuating devices expands to a certain displacement 701 whereas the other actuating device contracts in the same amount 703. This causes the slider to rotate around the center point 705. As a result, the read/write head has a displacement 707 that is normal to the tracks on the magnetic disk. The folded springs 604 provide sufficient compliance and deform accordingly as shown by deformations 709 and 711.

Preferably, the pair of actuator devices includes a first actuator device and a second actuator device. A first spring device is coupled to the first actuator device to counter act a first force provided by the first actuator device and a second spring device is coupled to the second actuator device to counter act a second force provided by the second actuator device. The first spring device and the second spring device are also operably coupled to the actuator devices to allow the read/write head to adjust to a surface topography of the magnetic disk medium. Preferably, each of the spring devices is folded. As shown, each of the actuator devices is an elongated member, which couples to one side of the tongue. The tongue includes the slider that is coupled to the read/write head. Each of the actuator devices is positioned in a predetermined manner from a center point of the tongue. The predetermined manner includes a predetermined distance. Preferably, the predetermined distance is about one millimeter or so, but can be slightly more or more preferably less, depending upon the application.

A method according to an embodiment of the present invention may be outlined as follows:

1. Provide an improved disk drive apparatus;
2. Move a movable member about a fixed position to move a read/write head coupled to a slider to a selected track on a disk;
3. Adjust the read/write head using an actuating device integrated on the gimbal, whereupon the actuating step moves the read/write head relative in a manner normal to the track on the magnetic disk;
4. Position the read/write head on the track using a finer and more accurate alignment than the primary actuating device such as a VCM;
5. Position the read/write head on the track using a faster alignment than the primary actuating device such as a VCM; and
6. Perform other steps, as desired.

The above sequence of steps provides a method according to an embodiment of the present invention. As shown, the method includes using an actuating device integrated on the gimbal to provide fine and quick alignment of the read/write head onto the disk track. Further details of the method are provided throughout the present specification and more particularly below.

FIGS. 8A to 8L show a detailed top-view diagram of a number of design variations of head, gimbal and PZT microactuator assembly 800 according to an embodiment of the present invention. These diagrams are merely examples, which should not unduly limit the scope of the claims herein. One of ordinary skill in the art would recognize many other variations, modifications, and alternatives. As shown, various embodiments include common features. As merely an example, each of the design variations includes actuation devices 801 and 803, which are provided in a pair, but may also include more than a pair. Each of the devices also includes a read/write head, which is coupled to the pair of actuation devices. Depending upon the embodiment, the assembly also includes spring devices 807 and 809, which are common in embodiments shown in FIGS. 8A through 8F. Preferably, the spring devices are folded spring designs. Alternative embodiments such as those provided in FIGS. 8G through 8L do not include spring devices. The pair of actuation devices in those embodiments provides support for the read/write head as well as moving the head from a first position to a second position in a continuous or stepped manner. Depending upon the embodiment, the read/write head movement can be amplified by putting the pair of actuating device closer to the center of the rotation, which are common in embodiments FIGS. 8B-8D 8I, 8J and 8L. Of course, one of ordinary skill in the art would recognize many other variations, modifications, and alternatives.

Figure 9:
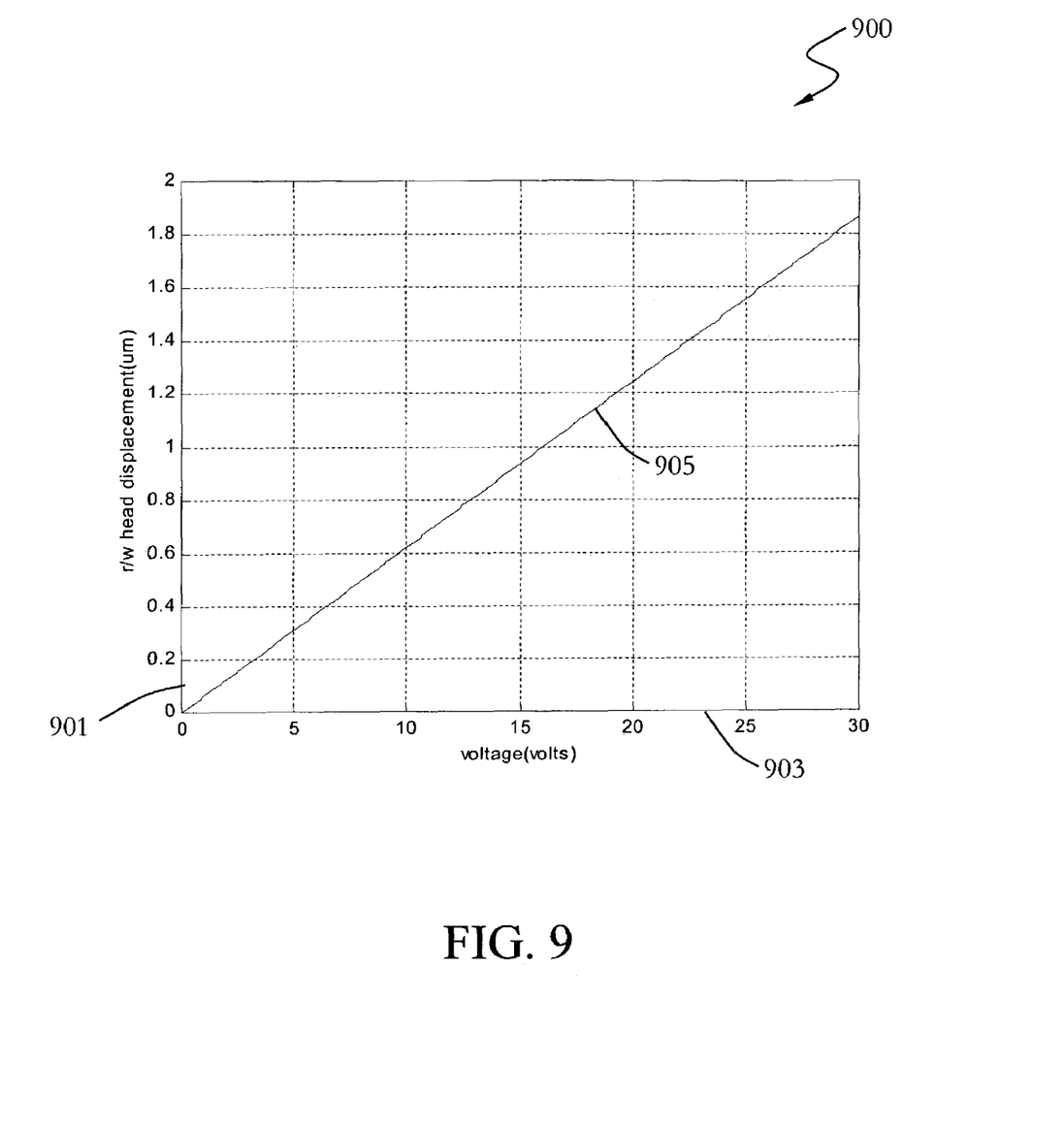
FIG. 9 is a diagram of a plot illustrating read/write head displacement against applied voltage according to embodiments of the present invention

FIG. 9 is a diagram of a plot illustrating read/write head displacement against voltage applied to the PZT microactuator devices according to embodiments of the present invention. This diagram is merely an example, which should not unduly limit the scope of the claims herein. One of ordinary skill in the art would recognize many other variations, modifications, and alternatives. As shown, the plot includes the read/write displacement along the vertical axis 901, which intersects with the voltage applied to the PZT actuating devices. The present embodiment describes the devices illustrate 905. As illustrated the plot illustrates a substantially linear relationship between the displacement and the voltage. Depending upon the application, there can be other relationships, such as those relationships that are not linear, but may be a combination of linear and other forms of relationships.

One of ordinary skill in the art would recognize many other variations, modifications, and alternatives. The above example is merely an illustration, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A disk drive apparatus, the apparatus comprising:
    a magnetic disk for storing information, the magnetic disk comprising a plurality of tracks;
    a movable support member coupled to the magnetic disk, the movable support member a gimbal, the gimbal having a tongue portion;
    a slider device coupled to the tongue portion;
    a read/write head coupled to the slider device;
    a drive device coupled between the magnetic disk and the movable support member, the drive device being adapted to move the read/write head on a track on the magnetic disk using the movable support member about a fixed pivot position;
    a pair of actuator devices connected to the gimbal to move the read/write head relative the track using a finer alignment of the read/write head than the moveable support member, the pair of actuator devices including a first actuator device having a first and movable end connected at a distal end of the gimbal immediately adjacent the slider and a second and fixed end connected at a proximal end of the gimbal and a second actuator device having a first and movable end connected at a distal end of the gimbal immediately adjacent the slider and a second and fixed end connected at a proximal end of the gimbal;
    a first folded spring device coupled to the first actuator device to counter act a first force provided by the first actuator device; and
    a second folded spring device coupled to the second actuator device to counter act second force provided by the second actuator device;
    whereupon the first folded spring device and the second folded spring device are also operably coupled to the actuator devices to allow the read/write head to adjust to a surface topography of the magnetic disk.

2. The apparatus of claim 1 wherein the actuator devices include piezoelectric material connected to the gimbal, whereupon the piezoelectric material acts as a shock absorbing material to absorb a mechanical force from the read/write head when the read/write head comes in contact with the magnetic disk.

3. The apparatus of claim 1 wherein the drive device is a voice coil and the first spring device and the second spring device are folded springs.

4. The apparatus of claim 1 wherein the movable support member is provided in a suspension assembly.

5. The apparatus of claim 1 wherein the actuating devices include piezoelectric material, the piezoelectric material being adapted to working in a transverse mode to allow the slider and the read/write head to move relative to the tracks on the magnetic disk.

6. The apparatus of claim 1 wherein the pair of actuating devices includes a first PZT material and a second PZT material, the first PZT material having a first end disposed relative to a first side of the slider and the second PZT material having a first end disposed relative to a second side of the slider, the first side being opposite of the second side, whereupon the first PZT material contracts by a first predetermined distance and the second PZT material expands by a second predetermined distance such that the slider rotates about an axis thereof to move the read/write head.

7. The apparatus of claim 6 wherein the piezoelectric material moves the read/write head by a distance x defined by $d31*L*V/t$, where $d31$ is transverse mode piezoelectric coefficient, L is the length of the PZT element, V is an applied voltage, t is the thickness of the PZT element.

8. The apparatus of claim 1 wherein the first and second folded spring devices are integrally formed with the gimbal tongue portion.

9. The apparatus of claim 1 wherein the gimbal includes the first and second folded springs.

10. The apparatus of claim 1 wherein the first and second folded spring devices allow the read/write head to adjust to the surface topography including surface height variations of the magnetic disk.

11. A disk drive apparatus comprising:
a flexible support member for supporting a read/write head above a magnetic disk having plural tracks formed thereon for storing data, the movable support member comprising a gimbal;
a slider connected to the gimbal;
the read/write head connected to the slider;
a first actuator device connected to a first side of the gimbal between a distal end of the gimbal and a proximal end of the gimbal, the first actuator device having a first end that is fixed relative to a loadbeam and a second end that moves relative to the loadbeam and that is directly coupled to the gimbal immediately adjacent the slider; and
a second actuator device connected to a second side of the gimbal that is opposite the first side between a distal end of the gimbal and a proximal end of the gimbal the second actuator device having a first end that is fixed relative to the loadbeam and a second end that moves relative to the loadbeam and that is directly coupled to the gimbal immediately adjacent the slider, the first and second actuators acting in opposite fashion to rotate the slider about an axis thereof.

12. The apparatus of claim 11 further comprising a first spring member connected to the first side of the gimbal and a second spring member connected to the second side of the gimbal, the first spring being biased to counteract the action produced by the first actuator, the second spring being biased to counteract the action produced by the second actuator.

13. The apparatus of claim 11 wherein the first and second actuator devices each is a piezoelectric element.

14. A disk drive apparatus comprising:
a flexible support member for supporting a read/write head above a magnetic disk having plural tracks formed thereon for storing data, the movable support member comprising a gimbal;
a slider connected to the gimbal;
the read/write head connected to the slider;
a first actuator having a first end connected adjacent a first portion of the slider and a second end connected to the gimbal;
a second actuator having a first end connected adjacent a second portion of the slider opposite the first portion and a second end connected to the gimbal, the first and second actuators acting in opposite fashion to rotate the slider about an axis thereof; and
first and second generally C-shaped springs integrally formed with the gimbal, the first and second actuators extending across a separation distance defined by top and bottom legs of the C-shape of the springs;
wherein when the actuators are activated, the first ends of the first and second actuators that are adjacent the slider are displaced, and the second ends of the first and second actuators that are closer to where the gimbal is attached to a load beam remain relatively fixed, the springs to counter act movement the two actuators.

* * * * *

UNITED STATES PATENT AND TRADEMARK OFFICE
CERTIFICATE OF CORRECTION

PATENT NO. : 7,375,930 B2 Page 1 of 1
APPLICATION NO. : 10/330407
DATED : May 20, 2008
INVENTOR(S) : Xiao Yang et al.

It is certified that error appears in the above-identified patent and that said Letters Patent is hereby corrected as shown below:

In column 10, line 29, before "springs" insert -- two --.

In column 10, line 29, after "springs" insert -- acting --.

In column 10, line 29, after "movement" insert -- of --.

Signed and Sealed this

Twenty-second Day of July, 2008

JON W. DUDAS
*Director of the United States Patent and Trademark Office*